US009541906B2

(12) United States Patent
Su

(10) Patent No.: US 9,541,906 B2
(45) Date of Patent: Jan. 10, 2017

(54) CONTROLLER CAPABLE OF ACHIEVING MULTI-VARIABLE CONTROLS THROUGH SINGLE-VARIABLE CONTROL UNIT

(71) Applicant: Hong-Te Su, Kaohsiung (TW)

(72) Inventor: Hong-Te Su, Kaohsiung (TW)

( * ) Notice: Subject to any disclaimer, the term of this patent is extended or adjusted under 35 U.S.C. 154(b) by 330 days.

(21) Appl. No.: 14/483,244

(22) Filed: Sep. 11, 2014

(65) Prior Publication Data
US 2016/0077499 A1 Mar. 17, 2016

(51) Int. Cl.
*G05B 13/02* (2006.01)
(52) U.S. Cl.
CPC .................................. *G05B 13/021* (2013.01)
(58) Field of Classification Search
CPC ........ G05B 13/00; G05B 13/02; G05B 13/021
See application file for complete search history.

(56) References Cited

U.S. PATENT DOCUMENTS

| | | | | |
|---|---|---|---|---|
| 6,373,033 B1* | 4/2002 | de Waard | ............. | G05B 13/048 219/483 |
| 7,292,906 B2* | 11/2007 | Funk | ................. | H01L 21/67253 257/E21.525 |
| 7,567,700 B2* | 7/2009 | Funk | .................... | G03F 7/70625 382/144 |
| 7,672,739 B2* | 3/2010 | Ganesan | ................ | G05B 11/42 700/29 |
| 2007/0237383 A1* | 10/2007 | Funk | .................... | G03F 7/70525 382/144 |
| 2007/0238201 A1* | 10/2007 | Funk | ....................... | H01L 22/12 438/14 |

* cited by examiner

*Primary Examiner* — Charles Kasenge
(74) *Attorney, Agent, or Firm* — Alan D. Kamrath; Kamrath IP Lawfirm, P.A.

(57) ABSTRACT

A controller includes a control unit, at least one DOF (Dynamic Offshoot Factor) unit, and a compensation unit. The control unit produces an output signal for a process according to a measured signal and a reference signal, so that the measured signal can be changed to approach the reference signal. The DOF unit receives a selection signal corresponding to a variable of the process that affects the measured signal or is affected by the control unit. Also, the DOF unit produces a DOF signal according to short-time and long-time average values of the selection signal. The compensation unit incorporates the DOF signal into one of the measured signal, the reference signal, and the output signal to obtain a compensation signal being sent back to the control unit, instead of the measured signal, the reference signal or the output signal, to facilitate controlling the process.

14 Claims, 6 Drawing Sheets

CONTROLLER CAPABLE OF ACHIEVING MULTI-VARIABLE CONTROLS THROUGH SINGLE-VARIABLE CONTROL UNIT

BACKGROUND OF THE INVENTION

The present invention relates to a controller and, more particularly, to a controller that can achieve multi-variable controls through a single-variable control unit.

FIG. 1 shows a schematic diagram of a dynamic process, and three or more process variables are included. The process variables may change with time, and may affect each other. Also, in a dynamic process, there are at least one independent variable and at least one dependent variable.

FIG. 2 shows a schematic diagram of a dynamic process with a single-variable controller. As shown, for controlling a dependent variable, a controlled variable (CV) is defined, and an SISO (single-input-single-output) control unit 101 is applied to the dynamic process to form a control loop. After the control unit 101 is applied to the dynamic process, the controlled variable (CV) can be controlled at a certain reference value or setpoint (SP) through an independent variable (called a manipulated variable, MV) of the dynamic process that affects the controlled variable (CV). In FIG. 2, the solid lines in the diagram indicate the input and output signals of the control unit 101 and the signal directions. The thin dashed line between two variables in the diagram indicates that one variable will affect the other associated variable. The thick dashed lines between multiple variables in the diagram indicate that one variable directly or indirectly affects the other associated variable. The arrows indicate the influence directions.

Industrial processes are usually controlled by using single-variable controllers due to the technology maturity, simplicity, and low cost. However, most of industrial processes require more than one process variables to be controlled. In control technology of the prior art, there are other control methodologies, such as cascade control, feed-forward control, and multi-variable control, being developed, which can expand the applications of single-variable controllers so that they can be used in industrial processes requiring control of multiple process variables. Conventionally, when solving an industrial process requiring control of multiple process variables, multiple single-variable controllers are usually employed, with each single-variable controller used for controlling a controlled variable. Namely, each single-variable controller has one individual control loop consisting of one pair of a MV and a CV, and thus can control only one process variable (i.e. the CV) and cannot use other process variables to facilitate controlling the industrial process.

Therefore, it is deserved to develop a controller, which can achieve multi-variable controls through a single-variable control unit, and especially, a single-variable controller, which can achieve multi-variable or multi-function control.

BRIEF SUMMARY OF THE INVENTION

For the above-mentioned issues, one object of the present invention is to provide a controller which can achieve multi-variable controls through a control unit. The controller can incorporate a process variable outside of a control loop of the control unit into the control loop, and, thus, the controller can work as a multi-variable or multi-function controller.

To achieve the above object, the controller may include a control unit, at least one DOF (Dynamic Offshoot Factor) unit, and a compensation unit. The control unit produces an output signal for a process according to a measured signal and a reference signal, so that the measured signal can be controlled. The DOF unit receives a selection signal corresponding to a variable of the process that affects the measured signal or is affected by the control unit. Also, the DOF unit produces a DOF signal according to a short-time average value and a long-time average value of the selection signal. The compensation unit incorporates the DOF signal into one of the measured signal, the reference signal, and the output signal to obtain a respective compensation signal being sent back to the control unit, instead of the respective measured signal, the reference signal or the output signal, to facilitate controlling the process.

In a preferred form, the control unit is a single-variable control unit, and the controller is a single-variable controller or a multi-variable controller.

In a preferred form, the measured signal, the reference signal, the output signal, and the compensation signal represents a value, which may be further treated with a function.

In a preferred form, the selection signal corresponds to a process variable of the process, or a measured signal, a reference signal or an output signal involved in another controller.

In a preferred form, the DOF signal is related to an offset value between a measured value of the selection signal and an average value of the selection signal.

In a preferred form, the short-time average value is obtained by taking one sample of the selection signal or by averaging S samples of the selection signal or by passing one sample of the selection signal through a first low-pass filter that has a settling time substantially the same as the time required for taking the average of S samples of the selection signal. The long-time average value is obtained by taking L samples of the selection signal or by passing one sample of the selection signal through a second low-pass filter that has a settling time substantially the same as the time required for taking the average of L samples of the selection signal, S is equal to or greater than 1, and L is greater than S.

In a preferred form, the compensation unit incorporates signals such that the DOF signal and one of the measured signal, the reference signal, and the output signal are added to obtain the compensation signal, or one of the measured signal, the reference signal, and the output signal is multiplied by a predetermined percent of the DOF signal to obtain the compensation signal.

In a preferred form, when the short-time average value of the selection variable is substantially equal to zero, the corresponding DOF signal is substantially a zero signal. When the short-time average value of the selection variable approaches the long-time average value of the selection signal, the corresponding DOF signal will approach zero and thus can be considered as zero.

In a preferred form, the DOF signal corresponds to a DOF calculated according to the following formula:

$$\beta = \frac{\tilde{x}(t) - \bar{x}(t)}{\bar{x}(t) + \alpha},$$

wherein $\beta$ represents the calculated DOF, $\tilde{x}(t)$ represents the short-time average value of the selection signal, $\bar{x}(t)$ represents the long-time average value of the selection signal, and $\alpha$ represents an adjustment parameter for preventing the formula's denominator from being zero and/or adjusting $\mu$. The calculated number $\beta$ can be further treated with a function to obtain a number corresponding to the DOF signal, which is in turn incorporated into one of the measured variable, the reference variable, and the output variable to obtain the compensation signal.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
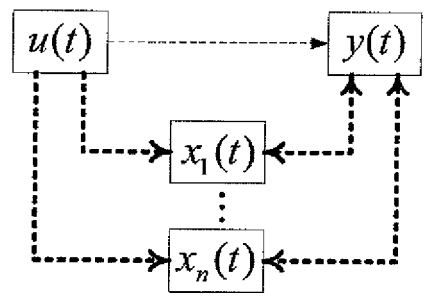
FIG. 1 shows a schematic diagram of a dynamic process.

The following paragraphs will illustrate various embodiments of the present invention, concerning a controller which can achieve multi-variable controls through one or more single-variable control units, with reference to the accompanying drawings, wherein identical elements of the embodiments will be indicated by the same reference numeral.

Figure 3:
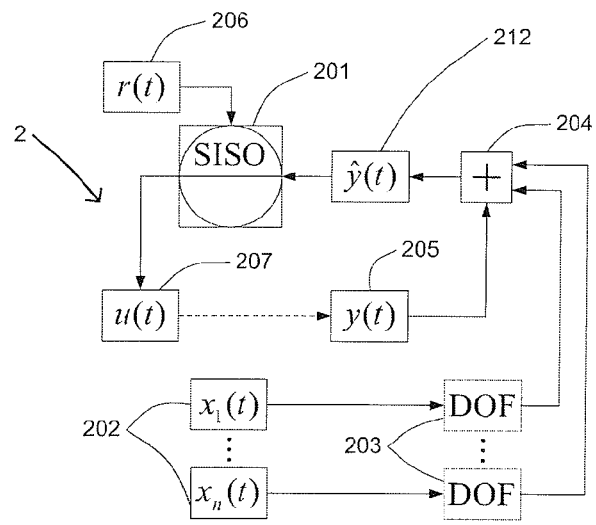
FIG. 3 shows a schematic diagram of a controller according to a first embodiment of the present invention.

In FIG. 3, a controller 2 according to a first embodiment of the present invention is shown. The controller 2 generally includes a control unit 201, at least one DOF (dynamic offshoot factor) unit 203, and a compensation unit 204, for controlling a process. The DOF unit 203 receives a selection signal corresponding to a process variable 202 of the process.

Figure 2:
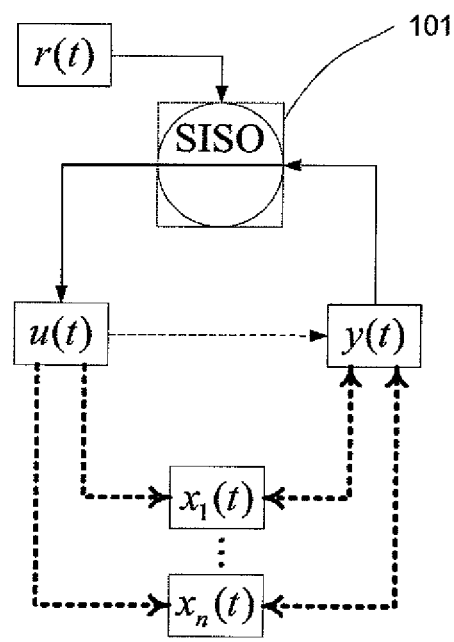
FIG. 2 shows a schematic diagram of a dynamic process with a single-variable controller.

Unlike the original control unit 101 as shown in FIG. 2, the control unit 201 of the present invention does not compare a measured signal 205 with a reference signal 206 to output an output signal 207, which allows the measured signal 205 to approach the reference signal 206, as shown in FIG. 3. In this embodiment, the measured signal 205 is replaced by a compensation signal 212 (see FIG. 3), as will be described in detail below. In the present invention, the control unit 201 can be implemented in a single-variable controller or a multi-variable controller.

The process variable 202 can affect the measured signal 205 or can be affected by the control unit 201. An additional process variable 202 can be selected to cooperate with an addition DOF unit for controlling the process. In this embodiment, multiple process variables 202 are used with multiple DOF units 203. The variables being cooperated with the DOF units are not limited to process variables of the process. The variables can be the measured signals, reference signals or output signals from other controllers.

Figure 4:
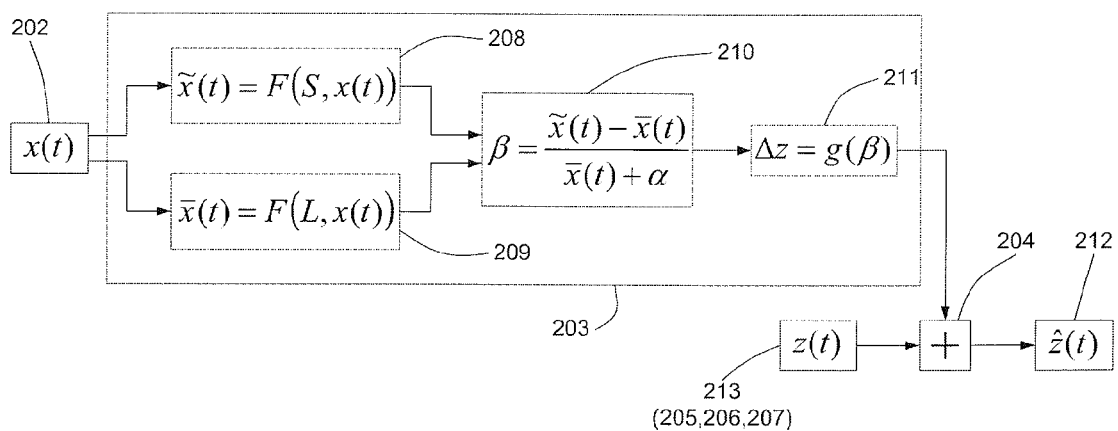
FIG. 4 shows a schematic diagram of a DOF unit used in the first embodiment of the present invention.

Each DOF unit 203 can produce a DOF signal according to a short-time average value and a long-time average value of one variable 202, and the DOF signal corresponds to a DOF (dynamic offshoot factor), which is a calculated value. FIG. 4 shows a schematic diagram of a typical DOF unit 203, which can calculate a short-time average value 208 and a long-time average value 209 of the selection variable. The short-time average value 208 is obtained by taking one sample of the selection variable or by taking S samples of the selection variable and averaging them. Alternatively, the short-time average value 208 can be obtained by taking one sample of the selection variable and passing the sample through a first low-pass filter. In this situation, the settling time of the first low-pass filter is substantially the same as the time required to take the average of S samples of the selection variable (S is greater than or equal to 1). The long-time average value 209 is obtained by taking by taking L samples of the selection variable (L is greater than S) and averaging them. Alternatively, the long-time average value 209 can be obtained by taking one sample of the selection variable and passing the sample through a second low-pass filter. In this situation, the settling time of the second low-pass filter is substantially the same as the time required to take the average of L samples of the selection variable (L is greater than S).

The formulas being used to calculate the DOF are listed as follows:

$$F(T, x(t)) = \sum_{i=0}^{T-1} \lambda_i x(t-i), \quad \text{(formula 1)}$$

$$\sum_{i=0}^{T-1} \lambda_i = 1$$

$$\tilde{x}(t) = F(S, x(t)) \quad \text{(formula 2)}$$

$$\bar{x}(t) = F(L, x(t)) \quad \text{(formula 3)}$$

$$\beta = \frac{\tilde{x}(t) + \alpha}{\bar{x}(t) + \alpha} - 1 = \frac{\tilde{x}(t) - \bar{x}(t)}{\bar{x}(t) + \alpha} \quad \text{(formula 4)}$$

Among the formulas, $F(T, x(t))$ is an average-value estimator that calculates the average value of a process variable $x(t)$ by taking T samples or by taking one sample being passed through a low-pass filter, $\lambda_i$ represents a coefficient of the filter in discrete form; $\alpha$ represents an adjusting parameter for preventing the formula's denominator from being zero and adjusting the value of $\beta$; $\tilde{x}(t)$ represents the short-time average value of the process variable; $\bar{x}(t)$ represents the long-time average value of the process variable; and $\beta$ represents the calculated DOF. Alternatively, formula 1 can be expressed in another form:

$$F(T, x(t)) = \gamma_0 x(t) + \sum_{i=1}^{N-1} \gamma_i F(T, x(t-i)),$$

$$\sum_{i=0}^{N-1} \gamma_i = 1,$$

wherein $y_i$ represents a coefficient of the filter in a discrete form; and wherein N represents the order of the filter.

Figure 5:
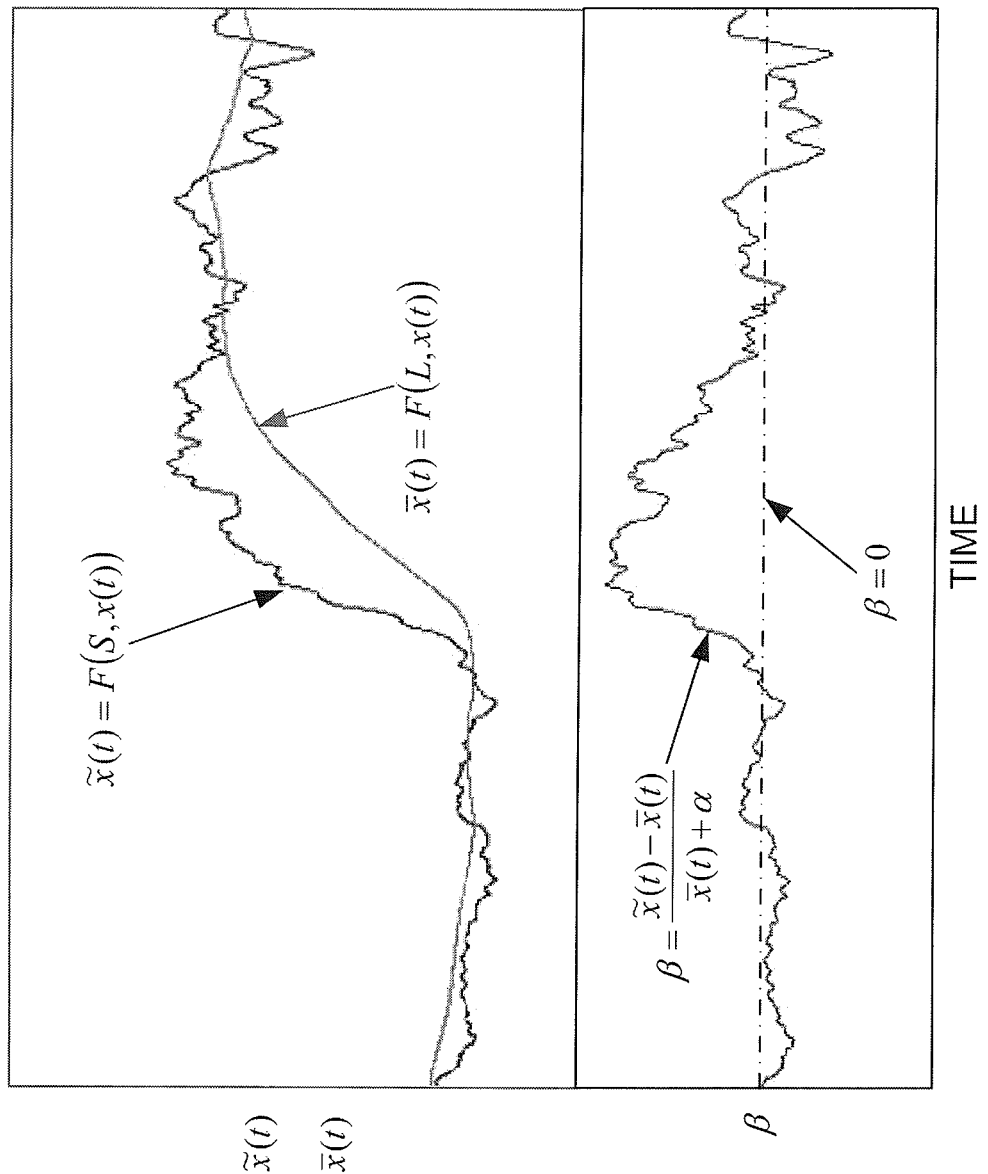
FIG. 5 shows schematic charts of a short-time average value, a long-time average value, and a calculated DOF.

FIG. 5 shows schematic charts of a short-time average value of a variable, a long-time average value of the variable, and a calculated DOF of the variable and the DOF is related to the severity that the short-time average value of the variable deviates from the long-time average value of the variable. Furthermore, the calculated DOF has the following characteristics:

1. The initial value of the DOF is zero.
2. When no significant difference exists between the short-time average value and the long-time average value or when both average values achieve a steady state, the calculated DOF will equal to or approach zero and thus can be considered as zero.
3. When the variable maintains substantially the same value for a long time, the calculated DOF will be equal to or approach zero and thus can be considered as zero.

The selection signal, corresponding to the variable 202, can be an original signal measured from the process or a converted signal with a physical meaning. Thus, an average value of the variable can be obtained by converting the samples thereof and then averaging the converted samples. Alternatively, the average value can be obtained by averaging the samples thereof and then converting the average value of the samples. Furthermore, the calculated DOF 210 can further go through a treatment, such as the g function shown in FIG. 4, to obtain a compensation value 211. The compensation value 11 can be multiplied by plus/minus 1 to indicate the control direction or can be expressed in plus/minus gain ratio to adjust the magnitude of a compensation signal.

Referring again to FIG. 3 and in conjunction with FIG. 4, the compensation unit 204 can incorporate the DOF signal, corresponding to the calculated DOF 210, into the measured signal 205 (or the reference signal 206 or the output signal 207) to produce a compensation signal 212, which can be further treated with a function, instead of the measured signal 205 (or the reference signal 206 or the output signal 207), and is sent back to the control unit 201 to facilitate controlling the process. In FIG. 4, the original signal (z(t)) 213 represents one of the measured signal 205, the reference signal 206, and the output signal 207, while the signal ($\hat{z}(t)$) 212 represents the corresponding compensation signal 212 of the measured signal 205, the reference signal 206 or the output signal 207. In FIG. 3, the selection signal of the variable 202 represents a signal that affects the measured signal 205, while the compensation signal 212 is used to replace the measured signal 205, and sent back to the control unit 201.

As shown, the compensation unit 204 incorporate signals such that the DOF signal, corresponding to the calculated DOF, and one of the measured signal 205, the reference signal 206 and the output signal 207 are added up to obtain the compensation signal, or one of the measured signal 205, the reference signal 206 and the output signal 207 is multiplied by a predetermined percent of the DOF signal to obtain the compensation signal. In FIG. 3, the DOF signal is added to the measured signal 205. Nevertheless, the compensation unit 204 can use other ways for incorporating the DOF signal. For example, the DOF signal can be treated with a function before incorporating it into the measured signal 205.

The present invention further provides a method for achieving multi-variable controls through a single-variable control unit, which includes the following steps:

1. selecting a process variable (x(t)) outside of a control loop of the control unit, with the process variable (x(t)) and the signal (z(t)) of the control loop affecting one way or the other. Namely, a change of the process variable (x(t)) will affect the signal (z(t)), or a change of the signal (z(t)) will affect the process variable (x(t));
2. calculating a short-time average value ($\tilde{x}(t)$) for the process variable (x(t)) through a first average-value estimator;
3. calculating a long-time average value ($\bar{x}(t)$) for the process variable (x(t)) through a second average-value estimator;
4. calculating a DOF ($\beta$) according to the short-time average value ($\tilde{x}(t)$) and the long-time average value ($\bar{x}(t)$);
5. calculating a compensation value ($\Delta z(t)$) according to the calculated DOF ($\beta$);
6. incorporating the compensation value ($\Delta z(t)$) into the signal (z(t)) to obtain a compensation signal ($\hat{z}(t)$) and to replace the original signal (z(t)) with the compensation signal ($\hat{z}(t)$); and
7. selecting another process variable if required, and repeating the above steps 1-6.

Figure 6:
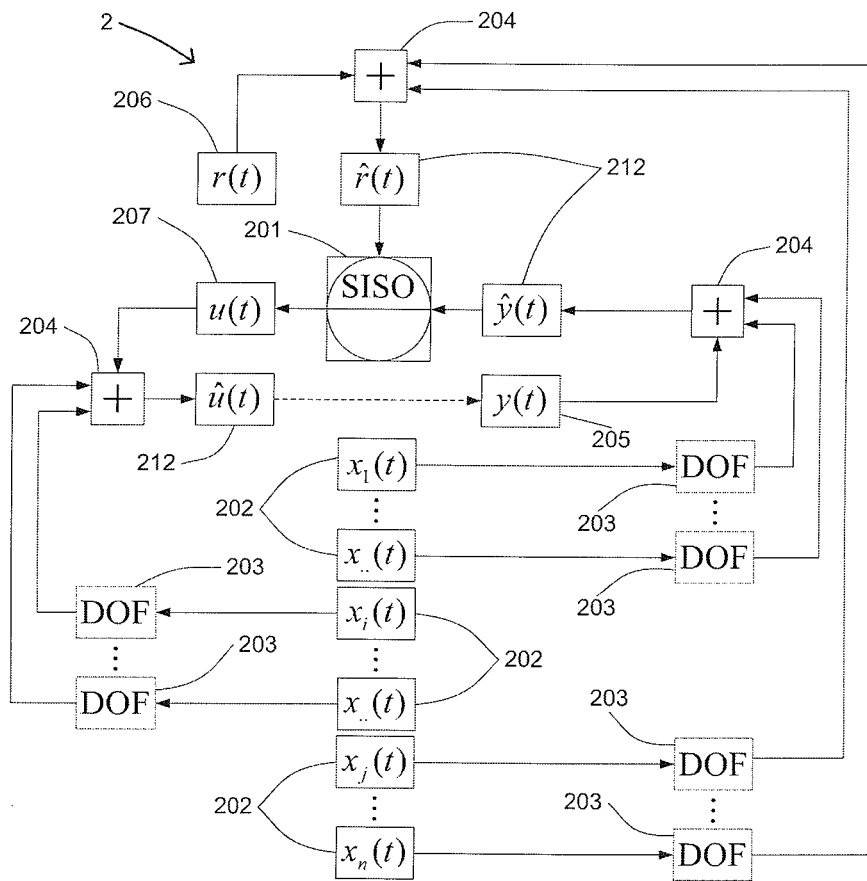
FIG. 6 shows a schematic diagram of a controller according to a second embodiment of the present invention.

In the above method, the signal (z(t)) represents the measured signal (y(t)), the reference signal (r(t)), or the output signal (u(t)) involved in the control loop of the control unit, or any combinations of the foregoing signals (see FIG. 6).

FIG. 6 shows a second embodiment of the present invention, and multiple process variables 202, which affects the measured signals 205, the reference signals 206 or the output signals 207, are selected for a process. Each DOF unit 203 can produce a DOF signal, based on a process variable, which is in turn incorporated into the measured signal 205, the reference signal 206 or the output signal 207 by the compensation unit 204, to obtain a compensation signal 212 for being used by the control unit 201. As such, the single-variable control unit 201 can achieve the function of controlling multiple variables.

The following paragraphs will illustrate the features of the controller 2 of the present invention in more detail.

Figure 7:
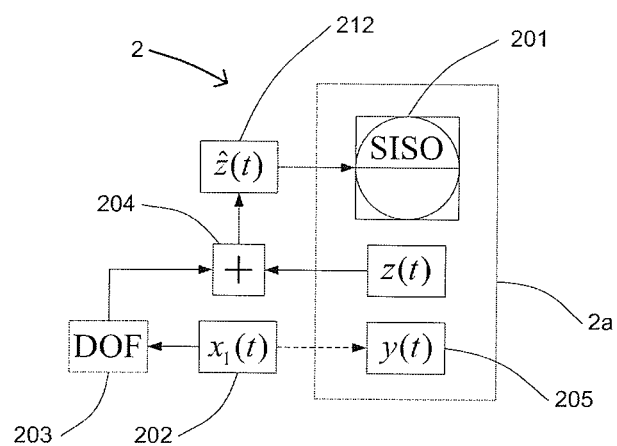
FIG. 7 shows a schematic diagram of a controller according to a third embodiment of the present invention, which contains a forward-control feature.

1. The controller 2 of the present invention can achieve a feed-forward control. Due to the fact that a calculated DOF used in the present invention is dimensionless, it can be applied to a control loop through a process variable that affects the signals of the control loop or is affected by the control loop. As shown in FIG. 7, a process variable 202, which is outside of the control loop 2a and can affect a measured signal 205 in the control loop 2a, can be incorporated into the control loop 2a through the DOF unit 203, so that the controller 2 can achieve an effect being similar to a feed-forward control. In FIG. 7, the signal (z(t)) can be the measured signal (y(t)), the reference signal (r(t)), or the output signal (u(t)).

Figure 8:
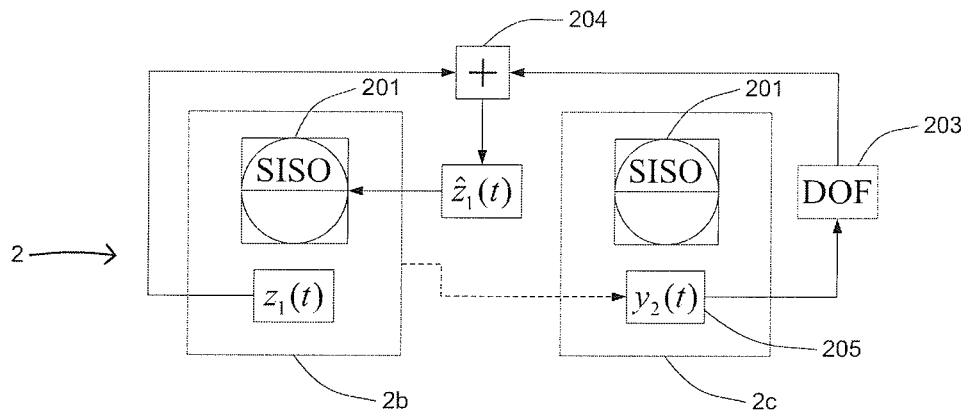
FIG. 8 shows a schematic diagram of a controller according to a fourth embodiment of the present invention, with one process variable controlled by two control units.

2. The controller 2 of the present invention allows multiple control units to control one variable at the same time and thus can achieve a multi-functional control. As shown in FIG. 8, since the control loop 2b can affect the measured signal 205 of the control loop 2c, the measured signal 205 can be incorporated into the control loop 2b through the DOF unit 203. As such, the two single-variable control units 201 respectively in the control loops 2b and 2c can control the measured signal 205 at the same time. In FIG. 8, the signal ($z_1(t)$) can be the measured signal, the reference signal, or the output signal involved in the control loop 2b. The control unit 201 of the control loop 2b can control the measured signal 205 involved in the control loop 2c in addition to its own measured signal. Thus, when the measured signal 205 deviates from the corresponding setpoint of the control loop 2c too much, the control unit 201 of the control loop 2b can assist controlling the measured signal 205 as well. Namely, the control unit 2b achieves a multifunctional control—controlling the CV of its own and controlling the CV of the other control loop.

Figure 9:
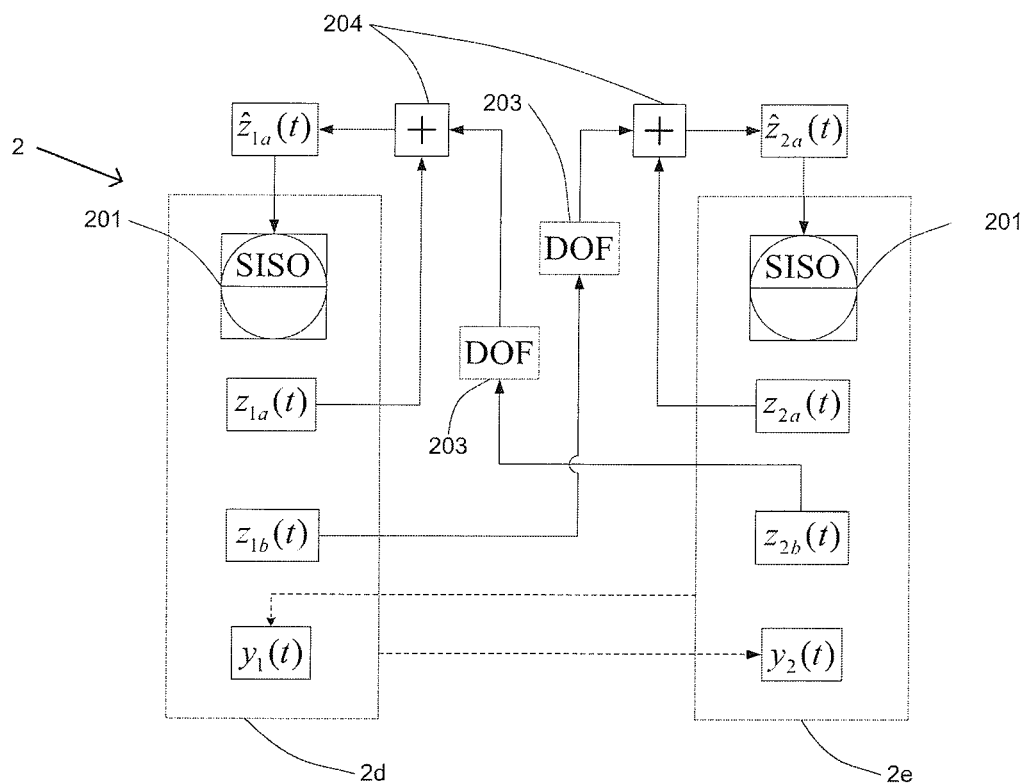
FIG. 9 shows a schematic diagram of a controller according to a fifth embodiment of the present invention, with two process variables in two control loops controlled by two control units respectively in the two control loops.

3. The controller 2 of the present invention allows multiple control units to control multiple variables involved in different control loops of the control units. As shown in FIG. 9, since the control loop 2d and the control loop 2e can affect each other, the output signal or reference signal in each of the control loops 2d and 2e can be incorporated into the other control loop through the respective DOF units 203, so that the control units 201 respectively in the control loops 2d and 2e can control each other. In this situation, the control units 201 can control multiple variables involved in different control loops. In FIG. 9, the signals ($Z_{1a}(t)$, $z_{1b}(t)$) can be the measured signal, the reference signal, or the output signal involved in the control loop 2d. Likewise, the signals ($z_{2a}(t)$, $z_{2b}(t)$) can be the measured signal, the reference signal, or the output signal involved in the control loop 2e. Although only two control loops 2d, 2e are indicated in FIG. 9, the present invention can be extended to more than two control loops per actual needs.

The controller 2 of the present invention can be applied to various applications. The following paragraphs will illustrate the present invention being used in a furnace application.

Figure 10:
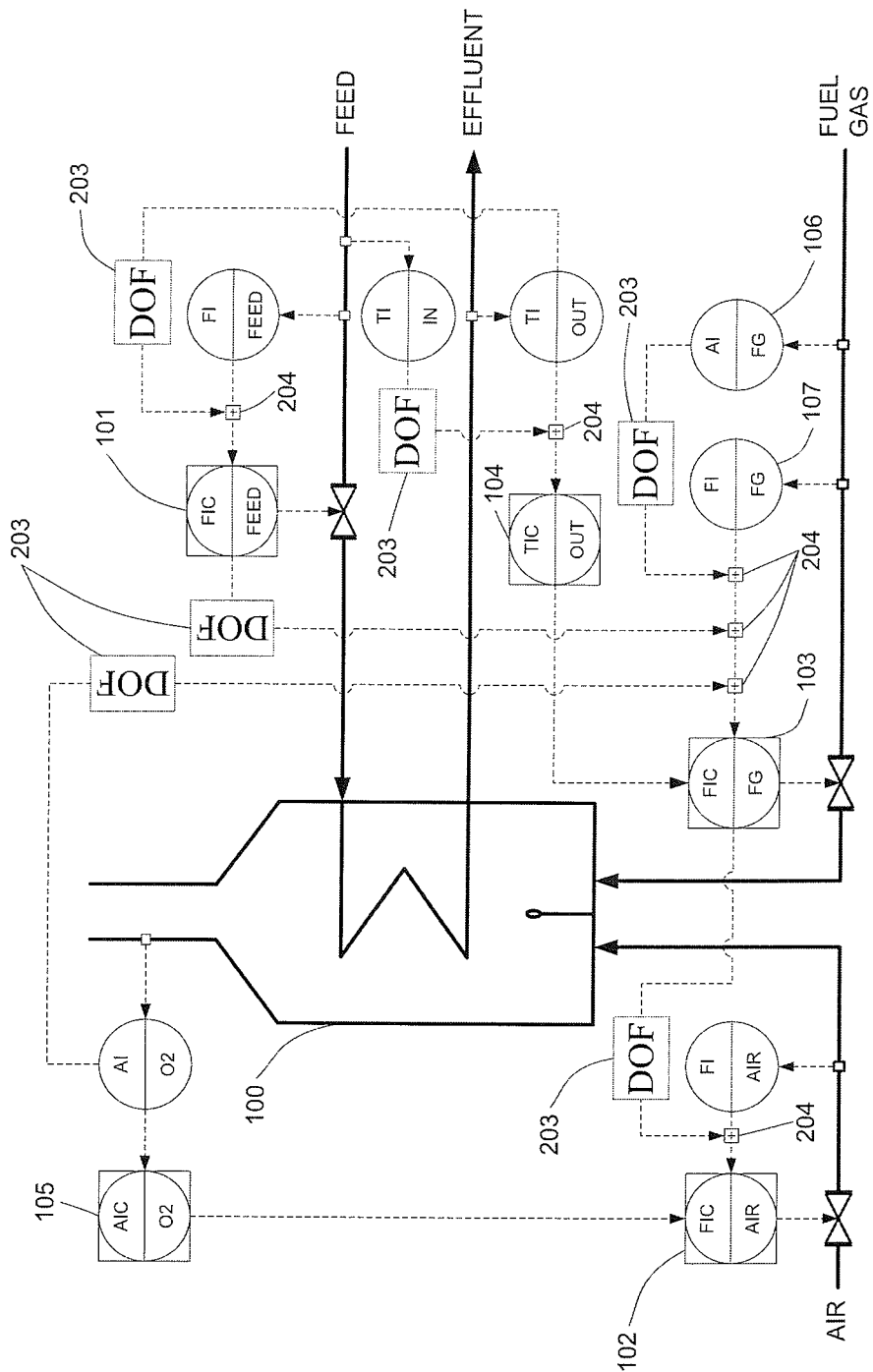
FIG. 10 shows a schematic diagram of a furnace application of the present invention.

FIG. 10 shows a schematic diagram of a furnace application of the present invention. In this application, the furnace 100 is supplied with air and fuel gas to perform a combustion operation for heating a material being conveyed into the furnace 100. Typically, the control operation required for the furnace 100 involves multiple variables. To ensure a stable operation for the furnace 100, the amounts of the air, the fuel gas and the material being conveyed into the furnace 100 should be properly set to achieve the operation objective of the furnace. Therefore, the furnace 100 should be equipped with a material flow controller 101, an air flow controller 102 and a fuel-gas flow controller 103, at a minimum. Furthermore, for controlling the conveyed material out of the furnace 100 at a predetermined temperature, a temperature controller 104 is provided for controlling the fuel-gas flow. Furthermore, for controlling the excess oxygen required in the combustion operation of the furnace 100, an excess oxygen controller 105 is provided. Also, a fuel-gas heat content indicator 106 and a fuel-gas flow indicator 107 are included for cooperating with the foregoing controllers.

In operation of the furnace 100, when the heat value of the fuel-gas flow (being equal to the fuel-gas flow multiplied by the heat content per unit of the flow) is unstable, the excess oxygen for the furnace 100 is difficult to be controlled. Since insufficient air will cause an incomplete combustion, emission of black smoke will be a direct result. Besides, other harmful gases may be produced in the combustion, thus causing pollution to the environment. On the other hand, too much air supply will cause energy waste. In fact, the excess oxygen is not only affected by the air flow but also by the heat value of the fuel-gas flow. However, the fuel-gas flow has been used in controlling the temperature of the conveyed material out of the furnace and used in the corresponding control loop. Although a single-variable controller can control only one process variable, with the provision of a DOF unit 203 of the present invention, a calculated DOF for a measured signal (y(t)) measured by an oxygen sensor (AI-O2) can be calculated according to the following formulas:

$$\bar{y}(t) = \frac{1}{L}\sum_{i=0}^{L-1} y(t-i) \quad \text{(formula 5)}$$

$$\beta = \frac{y(t) - \bar{y}(t)}{\bar{y}(t)}$$

Therefore, a modified fuel-gas flow ($\hat{F}_{FG}(t)$), corresponding a compensation signal being sent back to the fuel-gas flow controller 103, can be obtained by subtracting the calculated DOF ($\beta$) from the original fuel-gas flow ($F_{FG}(t)$), as shown in the following formulas (in this situation, k=−1):

$$\Delta F_{FG}(t) = k \cdot \beta$$

$$\hat{F}_{FG}(t) = F_{FG}(t) + \Delta F_{FG}(t) \quad \text{(formula 6)}$$

Regarding formula 6, for example, when the excess oxygen is less than its long-time average value, the calculated DOF ($\beta$) will be negative. Since k is a negative number, $\Delta F_{FG}(t)$ will be positive, and thus the compensated fuel-gas flow ($\hat{F}_{FG}(t)$) will be greater than the original fuel-gas flow ($F_{FG}(t)$). For the fuel-gas flow controller 103, when its CV (the compensated gas flow) is adjusted, it will function to respond the adjustment. Thus, under the circumstances that the reference signal of the fuel-gas flow controller 103 is not adjusted, since the compensated flow ($\hat{F}_{FG}(t)$) exceeds the original fuel-gas flow ($F_{FG}(t)$) by $\Delta F_{FG}(t)$, namely, the compensation signal of the fuel-gas flow controller 103 increases, the fuel-gas flow controller 103 will change its output signal to reduce the CV (i.e. the compensated fuel-gas flow). When other conditions of the fuel-gas flow controller 103 are not changed, the fuel-gas flow supplied to the furnace 100 is expected to be reduced by $\Delta F_{FG}(t)$.

With the present invention, when the excess oxygen is too low, in addition to the excess oxygen controller 105 being able to increase the air flow, the fuel-gas flow can be reduced by the fuel-gas flow controller 103 due to the calculated DOF ($\beta$) of the excess oxygen being incorporated into the original fuel-gas flow. Thus, when the excess oxygen in the furnace is too low and about to emit black smoke, the calculated DOF ($\beta$) enables the fuel-gas flow controller 103 to reduce the fuel-gas flow. In practice, number (k) of formula 6 can be expressed by the following formula:

$$k = \begin{cases} -a & \text{if } \beta(t) < b \\ 0 & \text{if } \beta(t) \geq b \end{cases}, \quad \text{(formula 7)}$$

$$a, b > 0$$

Formula 7 defines number (k), wherein number (a) represents a positive number; and number (b) represents a positive number corresponding to the minimum excess oxygen required for the furnace, under which emission of black smoke will not occur. With the definition of number (k), the fuel-gas flow will be reduced only when the calculated DOF ($\beta$) is less than number (b). Under normal conditions, namely, DOF ($\beta$) being greater than or equal to number (b), the fuel-gas flow controller 103 will function merely to control the temperature of the conveyed material out of the furnace. When the calculated DOF ($\beta$) is smaller than number (b) (in this situation, emission of black smoke is about to happen), the fuel-gas flow controller 103 can function to cause the fuel-gas control valve to reduce the fuel-gas flow to eliminate emitting black smoke. When the short-time average value of the excess oxygen approaches the corresponding long-time average value, the calculated DOF (β) will approach zero and thus will not affect the fuel-gas flow controller 103.

When the excess oxygen is very close to its long-time average value, the calculated DOF of the excess oxygen will approach zero. Namely, the compensated fuel-gas flow ($\hat{F}_{FG}(t)$) will be very close to the original fuel-gas flow ($F_{FG}(t)$). In this situation, the fuel-gas flow controller 103 will function as usual. When the excess oxygen becomes low in short time, there will be not enough time to actuate an air baffle (or shutter) by the air flow controller 102. However, with the provision of the DOF unit of the present invention, the fuel-gas control valve can be adjusted by the fuel-gas flow controller 103 to reduce the fuel-gas flow, so that emission of black smoke can be prevented. In principle, when the excess oxygen becomes too low in short time, the calculated DOF will be negative, and, thus, the compensated fuel-gas flow ($\hat{F}_{FG}(t)$) will be greater than the original fuel-gas flow ($F_{FG}(t)$), so that the corresponding compensation signal sent back to the fuel-gas flow controller 103 by the compensation unit 204 will increase. Thus, the fuel-gas flow controller 103 will adjust the fuel-gas control valve to reduce the fuel-gas flow until the fuel-gas flow reaches the setpoint (a value corresponding to the reference signal). Consequently, the fuel-gas flow will be reduced, less fuel gas requires less air, and, thus, the excess oxygen in the furnace will be increased to prevent emitting black smoke. On the other hand, the temperature controller 104 installed at the outlet of the furnace 100 outputs a signal to the fuel-gas flow controller 103 for controlling the temperature of the conveyed material out of the outlet, so that the temperature of the conveyed material can approach the corresponding setpoint. For the excess oxygen controller 105 installed at the flue of the furnace 100, the excess oxygen controller 105 can output a signal to the air flow controller 102 for controlling the air flow supplied to the furnace. In addition, as mentioned above, the oxygen sensor (AI-O2) can output a signal to the fuel-gas flow controller 103 through a DOF unit for controlling the fuel-gas flow. In this situation, two controllers, including the air flow controller 102 and the fuel-gas flow controller 103 can control one process variable, i.e. the excess oxygen, at the same time. Thus, the control performance can be increased significantly.

In summary, the controller 2 of the present invention can incorporate a DOF signal into a measured signal, a reference signal, or an output signal to obtain a compensation signal being sent back to a control unit for a process, instead of the measured signal, the reference signal, or the output signal. As such, the present invention can achieve multi-variable or multi-function controls through a single-variable control unit and thus can enhance the control performance of the process.

The descriptions set forth above illustrate simply certain preferred embodiments of the present invention. All effectively equivalent modifications or changes without departing from the spirit and scope of the present invention are within the invention hereinafter claimed. For example, if a control unit is provided for manual operation or if a control unit is ignored or omitted, a DOF signal issued from the DOF unit according to a measured signal can still provide operators a warning message. Also, the controller of the present invention can be implemented by hardware or software or combination of both.

The invention claimed is:
1. A controller for achieving multi-variable controls through a single-variable control unit, comprising:
   a control unit, which produces an output signal for a process according to a measured signal and a reference signal, wherein the measured signal is able to be changed;
   at least one DOF (Dynamic Offshoot Factor) unit, which receives a selection signal corresponding to a variable of the process that affects the measured signal or is affected by the control unit, and which produces a DOF signal according to short-time and long-time average values of the selection signal; and
   a compensation unit, which incorporates the DOF signal into one of the measured signal, the reference signal, and the output signal to obtain a respective compensation signal being sent back to the control unit, instead of the measured signal, the reference signal or the output signal, to facilitate controlling the process, wherein the DOF signal is related to an offset value between a measured value of the selection signal and an average value of the selection signal, wherein a short-time average value is obtained by taking one sample of the selection signal or by averaging S samples of the selection signal or by passing one sample of the selection signal through a first low-pass filter that has a settling time substantially the same as the time required for taking an average of the S samples of the selection signal; wherein a long-time average value is obtained by taking L samples of the selection signal or by passing the one sample of the selection signal through a second low-pass filter that has a settling time substantially the same as the time required for taking an average of the L samples of the selection signal; and wherein S is equal to or greater than 1, and L is greater than S.

2. The controller of claim 1, wherein the control unit is a single-variable control unit, and wherein the controller is a single-variable controller or a multi-variable controller.

3. The controller of claim 1, wherein the measured signal, the reference signal, the output signal, and the compensation signal represents a value, which is further treated with a function.

4. The controller of claim 1, wherein the selection signal corresponds to a process variable of the process, or a measured signal, a reference signal or an output signal involved in another controller.

5. The controller of claim 1, wherein the compensation unit incorporates signals such that the DOF signal and one of the measured signal, the reference signal, and the output signal are added up to obtain the compensation signal, or one of the measured signal, the reference signal, and the output signal is multiplied by a predetermined percent of the DOF signal to obtain the compensation signal.

6. The controller of claim 1, wherein when the short-time average value of the selection variable is substantially equal to zero, the corresponding DOF signal is substantially a zero signal; and wherein when the short-time average value of the selection variable approaches the long-time average value of the selection signal, the corresponding DOF signal will approach zero and thus can be considered as zero.

7. A controller for achieving multi-variable controls through a single-variable control unit, comprising:
   a control unit, which produces an output signal for a process according to a measured signal and a reference signal, wherein the measured signal is able to be changed;
   at least one DOF (Dynamic Offshoot Factor) unit, which receives a selection signal corresponding to a variable of the process that affects the measured signal or is affected by the control unit, and which produces a DOF signal according to short-time and long-time average values of the selection signal; and a compensation unit, which incorporates the DOF signal into one of the measured signal, the reference signal, and the output signal to obtain a respective compensation signal being sent back to the control unit, instead of the measured signal, the reference signal or the output signal, to facilitate controlling the process, wherein the DOF signal corresponds to a DOF calculated according to the following formula:

$$\beta = \frac{\tilde{x}(t) - \bar{x}(t)}{\tilde{x}(t) + \alpha},$$

wherein $\beta$ represents the calculated DOF, $\tilde{x}(t)$ represents a short-time average value of the selection signal, $\bar{x}(t)$ represents a long-time average value of the selection signal, and $\alpha$ represents an adjustment parameter for preventing the formula's denominator from being zero and adjusting $\beta$.

8. The controller of claim 7, wherein the calculated number $\beta$ is further treated with a function to obtain a number corresponding to the DOF signal, which is in turn incorporated into one of the measured variable, the reference variable, and the output variable to obtain the compensation signal.

9. The controller of claim 7, wherein the control unit is a single-variable control unit, and wherein the controller is a single-variable controller or a multi-variable controller.

10. The controller of claim 7, wherein the measured signal, the reference signal, the output signal, and the compensation signal represents a value, which is further treated with a function.

11. The controller of claim 7, wherein the selection signal corresponds to a process variable of the process, or a measured signal, a reference signal or an output signal involved in another controller.

12. The controller of claim 7, wherein the compensation unit incorporates signals such that the DOF signal and one of the measured signal, the reference signal, and the output signal are added up to obtain the compensation signal, or one of the measured signal, the reference signal, and the output signal is multiplied by a predetermined percent of the DOF signal to obtain the compensation signal.

13. The controller of claim 7, wherein when the short-time average value of the selection variable is substantially equal to zero, the corresponding DOF signal is substantially a zero signal; and wherein when the short-time average value of the selection variable approaches the long-time average value of the selection signal, the corresponding DOF signal will approach zero and thus can be considered as zero.

14. The controller of claim 7, wherein the DOF signal is related to an offset value between a measured value of the selection signal and an average value of the selection signal.

* * * * *